US009624371B2

(12) United States Patent
Brule et al.

(10) Patent No.: US 9,624,371 B2
(45) Date of Patent: Apr. 18, 2017

(54) COMPOSITION BASED ON POLY(ARYLENE ETHER KETONE) HAVING IMPROVED PROPERTIES

(71) Applicant: ARKEMA FRANCE, Colombes (FR)

(72) Inventors: Benoit Brule, Beaumont-le-Roger (FR); Richard Audry, Lons (FR); Jerome Pascal, Grandchain (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 14/920,075

(22) Filed: Oct. 22, 2015

(65) Prior Publication Data

US 2016/0115314 A1 Apr. 28, 2016

(30) Foreign Application Priority Data

Oct. 22, 2014 (FR) ...................... 14 60158

(51) Int. Cl.
*C08G 65/48* (2006.01)
*C08L 71/00* (2006.01)

(52) U.S. Cl.
CPC .......... *C08L 71/00* (2013.01); *C08G 2650/40* (2013.01); *C08L 2205/02* (2013.01); *C08L 2205/025* (2013.01)

(58) Field of Classification Search
CPC ........................... C08L 71/00; C08L 2205/025
USPC ....................................................... 524/540
See application file for complete search history.

(56) References Cited

U.S. PATENT DOCUMENTS 5,342,664 A  8/1994  Drotloff

FOREIGN PATENT DOCUMENTS

EP  2272899  1/2011

OTHER PUBLICATIONS

Wang et al., Macromolecules, 30, 4544-4550, 1997.*
French Search Report dated Jun. 10, 2015 for French Application No. 1460158.
Gardner, K.H., et al., "Structure, crystallization and morphology of poly (aryl ether ketone ketone)," Jan. 2, 1992, pp. 2483-2495, vol. 33(12), Polymer, Elsevier Science Publishers B.V., GB.
Sham, C.K., et al., "Blends of two poly(aryl ether ketones)," Jun. 1988, pp. 1016-1020, vol. 29(6), Polymer.
Wang, W., et al., "Dynamic study of crystallization- and melting-induced phase separation in PEEK/PEKK blends," Aug. 11, 1997, pp. 4544-4550, vol. 30(16), Macromolecules.

* cited by examiner

*Primary Examiner* — Hui Chin
(74) *Attorney, Agent, or Firm* — RatnerPrestia

(57) ABSTRACT

The present invention relates to a composition based on poly(ether ether ketone) (PEEK) comprising poly(ether ketone ketone) (PEKK), characterized in that the poly(ether ketone ketone) (PEKK) comprises a mixture of terephthalic and isophthalic units, the percentage by weight of terephthalic units, with respect to the sum of the terephthalic and isophthalic units, being between 55 and 85%, limits included, and preferably between 55 and 70%, the said composition comprising between 1 and 40%, limits included, preferably between 5 and 40% and more preferably still between 10 and 30% by weight of PEKK, with respect to the total weight of the composition.

15 Claims, 1 Drawing Sheet

_COMPOSITION BASED ON POLY(ARYLENE ETHER KETONE) HAVING IMPROVED PROPERTIES_

CROSS-REFERENCE TO RELATED APPLICATION

This application claims priority to French Application No. 1460158, filed Oct. 22, 2014, the entire disclosure of which is incorporated herein by reference in its entirety for all purposes.

FIELD OF THE INVENTION

The invention relates to the field of poly(arylene ether ketone)s and more specifically to that of compositions based on poly(ether ether ketone) (denoted PEEK in the continuation of the description).

More particularly, the invention relates to a composition based on poly(ether ether ketone (PEEK) having improved properties and also to a process for improving at least one property of a PEEK-based composition. The composition according to the invention more particularly exhibits a slow rate of crystallization and, on the other hand, better mechanical properties.

DESCRIPTION OF THE RELATED ART

Poly(arylene ether ketone)s (PAEKs) are high performance materials having elevated thermomechanical properties. They are composed of aromatic nuclei bonded via an oxygen atom (ether) and/or via a carbonyl group (ketone). Their properties depend mainly on the ether/ketone ratio. In the preceding abbreviations, E denotes an ether functional group and K denotes a ketone functional group. In the continuation of the document, these abbreviations will be used instead of the usual names to denote the compounds to which they relate.

Poly(arylene ether ketone)s are used for applications restricting in temperature and/or mechanical stresses, indeed even chemical stresses. These polymers are encountered in fields as varied as aeronautics, offshore drilling operations or medical implants. They can be employed by moulding, extrusion, compression, spinning or also laser sintering.

In the family of PAEKs, the poly(ether ether ketone) (PEEK) is particularly used in the context of the abovementioned applications. However, it exhibits the disadvantage of crystallizing very rapidly, which can generate large internal stresses in the manufactured parts based on this material during the cooling thereof. In some cases, such as PEEK coatings of metal parts or in the case of bulk PEEK parts, these internal stresses can result in splitting of the material. A subsequent annealing stage, followed by slow cooling, is generally necessary in order to remove or at least reduce these internal stresses. In point of fact, such a stage proves to be lengthy and thus involves a not insignificant additional expenditure for the parts thus manufactured.

Furthermore, in the specific case of laser sintering, the rapid kinetics of crystallization can result in deformation of the part. Such deformation is also known as "curling". Consequently, in this case, the geometry of the part is not optimal.

Finally, even if the PEEKs already have good mechanical properties, it can be advantageous, for some applications, to further improve the mechanical properties of objects obtained by different types of processes such as moulding, injection moulding, extrusion or laser sintering. Thus, it can be advantageous to increase the yield point stress in order to be able to work a PEEK-based material under higher stresses without irreversibly deforming it but without, however, causing a deterioration in the other mechanical properties, such as elongation at break, for example. This is because an increase in the yield point stress conventionally amounts to lowering the value of the elongation at break of a material. In point of fact, for some applications, it can be important to retain a ductile material with a high elongation at break. It is thus generally advisable to find a compromise between the elongation at break and the yield point, in order to have a plastic material exhibiting mechanical properties suitable for the application for which it is dedicated.

A polymer alloy comprising between 60 and 98% by weight of a semicrystalline PAEK and between 40 and 2% by weight of an amorphous PAEK is known from the document U.S. Pat. No. 5,342,664. Such an alloy exhibits a higher elongation at break and a reduced viscosity in comparison with the semicrystalline PAEK alone. However, this document remains silent with regard to the rate of crystallization which generates the problems of deformations of parts or requires a lengthy and expensive postannealing stage in order to eliminate the internal stresses which have appeared in the part as a result of excessively rapid crystallization kinetics. Neither is mention made of the yield point of the alloy.

The paper entitled "Blends of two PAEK" which appeared in the review POLYMER, 1988, Vol. 29, June, pp. 1017-1020, describes the preparation of an alloy based on PEEK and on PEK, two polymers of the family of the PAEKs which have the distinguishing feature of both crystallizing quickly. This paper studies the crystallization of the two compounds of the alloy and their behaviour. On the other hand, this document studies neither the rate of crystallization and its influence on the appearance of internal stresses and on the deformation of the parts obtained nor the mechanical properties of the alloy.

The paper entitled "Dynamic study of crystallization and melting-induced phase separation in PEEK/PEKK blends", Journal of the American Chemical Society, 1997, 30, pp.4544-4550, describes an alloy of PEEK and PEKK, the T/I ratio of which of the terephthalic units (T) to the isophthalic units (I) is 30/70. This document demonstrates that the incorporation of 30/70 PEKK in PEEK, in proportions by weight equal to 50/50, makes it possible to slow down the crystallization of the PEEK as a result of an interdiffusion of the two compounds of the alloy. This document does not study the mechanical properties of such an alloy.

It is thus an aim of the invention to overcome at least one of the disadvantages of the prior art. In particular, it is an aim of the invention to provide a PEEK-based composition, at least one property of which is improved, and a process for improving at least one property of such a PEEK-based composition, so as to make possible the preparation of parts from such a composition which exhibit a significant reduction in the internal stresses so that it is possible to dispense with the additional postannealing stage, which are not deformed and which exhibit enhanced mechanical properties.

BRIEF SUMMARY OF THE INVENTION

Surprisingly, it has been discovered that a composition based on poly(ether ether ketone) (PEEK) comprising poly (ether ketone ketone) (PEKK), characterized in that the poly(ether ketone ketone) (PEKK) comprises a mixture of terephthalic and isophthalic units, the percentage by weight of terephthalic units, with respect to the sum of the terephthalic and isophthalic units, being between 55 and 85%, limits included, and preferably between 55 and 70%, the said composition comprising between 1 and 40%, limits included, preferably between 5 and 40% and more preferably still between 10 and 30% by weight of PEKK, with respect to the total weight of the composition, exhibits not only slowing in the kinetics of crystallization, in comparison with that of a pure PEEK, but also a gain with regard to two, generally antagonistic, mechanical properties, since the yield point stress and the elongation at break are both increased, in comparison with a pure PEEK.

According to other optional characteristics of the composition:

the PEEK can be replaced with PEK or PEKEKK,
the PEKK can be a PEKK blend, each PEKK exhibiting a percentage by weight of terephthalic units, with respect to the sum of the terephthalic and isophthalic units, of between 55 and 85%, limits included, and preferably between 55 and 70%,
the composition additionally comprises at least one filler and/or at least one additive,
the proportion by weight of PEEK in the composition comprises from 60 to 99%, limits included, preferably between 60 and 95% and more preferably still between 70 and 90%, with respect to the total weight of the composition.

Another subject-matter of the invention is a process for improving at least one property of a PEEK-based composition, the said process consisting in incorporating PEKK in the said PEEK-based composition, the said process being characterized in that the PEKK comprises a mixture of terephthalic and isophthalic units, the percentage by weight of terephthalic units, with respect to the sum of the terephthalic and isophthalic units, being between 55 and 85%, limits included, and preferably between 55 and 70%, and in that the PEKK is incorporated in the said composition in proportions of between 1 and 40%, limits included, preferably between 5 and 40% and more preferably still between 10 and 30% by weight, with respect to the total weight of the composition.

Finally, the invention relates to an object manufactured from a composition as described above by a technology chosen from laser sintering, moulding, injection moulding or extrusion.

DESCRIPTION OF THE FIGURES

Other advantages and characteristics of the invention will become apparent on reading the following description, given as illustrative and nonlimiting example, with reference to the appended figures, which represent.

DETAILED DESCRIPTION OF CERTAIN EMBODIMENTS OF THE INVENTION

Figure 1:
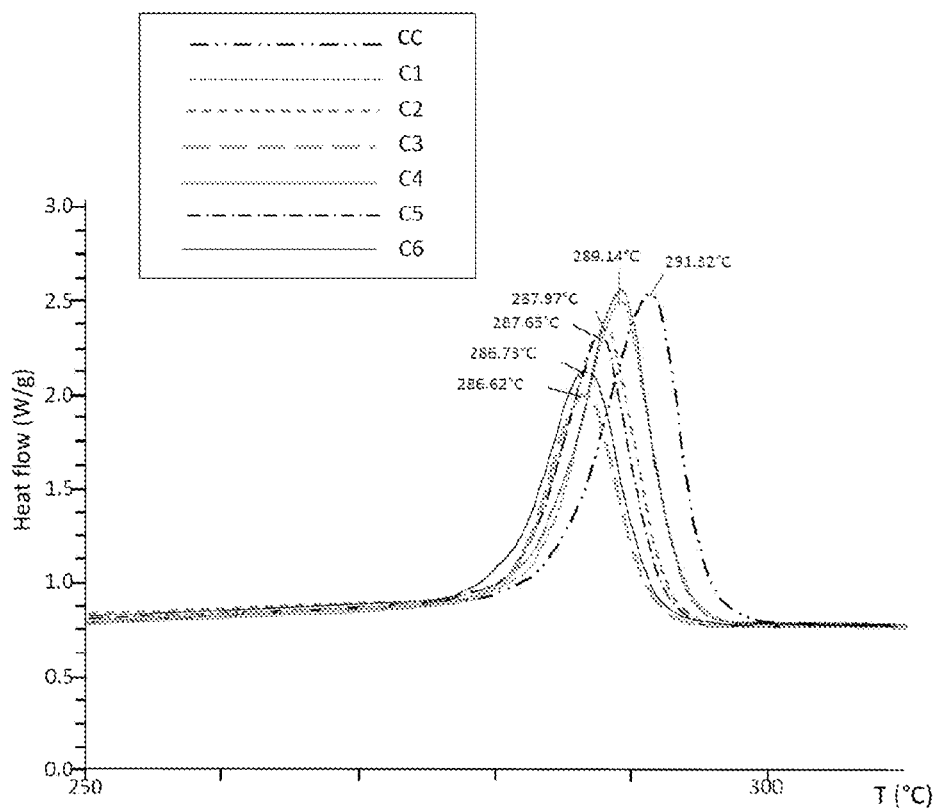
FIG. 1, the change in the heat flow of seven PEEK-based compositions as a function of temperature, FIG. 2, the change in the degree of crystallization of four PEEK-based compositions with respect to time.

The composition which is a subject-matter of the invention is based on PEEK. The constituent PEEK matrix of the composition can also be replaced by PEK or PEKEKK. In the abbreviations used, E denotes an ether functional group and K denotes a ketone functional group.

The presence of PEKK, possessing terephthalic and isophthalic units, in the PEEK-based composition makes it possible to slow down the kinetics of crystallization of the PEEK, and thus to limit the internal stresses which may result in splits during the cooling of the material, and to obtain nondeformed parts, the geometry of which meets expectations. Terephthalic and isophthalic unit is understood to mean the formula of terephthalic acid and isophthalic acid respectively.

Preferably, the PEKK incorporated in the PEEK-based composition comprises a percentage by weight of terephthalic units, with respect to the sum of the terephthalic and isophthalic units, of between 55 and 85%, limits included, more preferably still between 55 and 70% and more preferably still of the order of 60%. Such a PEKK with approximately 60% of terephthalic units is a material having very slow crystallization, typically 20 minutes during an isothermal crystallization at temperatures of between 240 and 260° C., and exhibiting a glass transition temperature Tg of the order of 160° C. and a melting point of the order of 305° C.

In particular, the variation in the proportions of terephthalic and isophthalic units of the PEKK, within the abovementioned range of proportions, makes it possible to adjust the said kinetics of crystallization of the PEEK. The kinetics of crystallization will be studied either under anisothermal conditions, that is to say during the cooling via a temperature gradient, or under isothermal conditions, that is to say that the degree of crystallization will be monitored at a given temperature. In the case of the study of the crystallization under anisothermal conditions, the lower the crystallization temperature, the slower the kinetics of crystallization. It is consequently possible to obtain a range of compositions based on PEEK and on PEKK, for which the rate of crystallization is known for each composition and is adapted according to the subsequent application of the said compositions.

Preferably, the composition comprises between 60 and 99%, limits included, preferably between 60 and 95% and more preferably still between 70 and 90% by weight of PEEK, with respect to the total weight of the composition, and between 1 and 40%, limits included, preferably between 5 and 40% and more preferably still between 10 and 30% by weight of PEKK, with respect to the total weight of the composition.

Such a composition advantageously makes it possible to improve two, generally antagonistic, mechanical properties of the PEEK. This is because the addition of PEKK possessing terephthalic and isophthalic units, in the abovementioned proportions, with a percentage by weight of between 1 and 40%, preferably between 5 and 40% and more preferably still between 10 and 30%, with respect to the total weight of the composition, makes it possible to obtain a gain of between 5 and 15% in the yield point and an elongation at break improved by a factor which can range up to 3.

The composition can in addition comprise one or more additives or contain different compounds, such as fillers, in particular inorganic fillers, such as carbon black, nanotubes, short (glass or carbon) fibres, long fibres, ground or non-ground fibres, stabilizing agents (light, in particular UV, and heat stabilizing agents), glidants, such as silica, or also optical brighteners, dyes, pigments or a combination of these fillers and/or additives.

The composition which has just been described consists of a PEEK-based matrix. In an alternative form, the PEEK matrix can be replaced with a PEK or PEKEKK matrix.

In addition, the PEKK incorporated in the PEEK-based composition, or PEK-based or PEKEKK-based composition, can be a PEKK blend, provided that each PEKK exhibits a percentage by weight of terephthalic units, with respect to the sum of the terephthalic and isophthalic units, of between 55 and 85%, preferably between 55 and 70% and more preferably still of the order of 60%.

In addition, the invention relates to a process for improving at least one property of a PEEK-based composition, the said process consisting in incorporating PEKK in the said PEEK-based composition. The incorporated PEKK comprises a mixture of terephthalic and isophthalic units, the percentage by weight of terephthalic units, with respect to the sum of the terephthalic and isophthalic units, being between 55 and 85% and preferably between 55 and 70% and more preferably still of the order of 60%. Advantageously, the PEKK is incorporated in the said composition in proportions of between 1 and 40%, preferably between 5 and 40% and more preferably still between 10 and 30% by weight, with respect to the total weight of the composition.

Such an incorporation of PEKK in the PEEK-based composition makes it possible not only to adjust the kinetics of crystallization of the PEEK but in addition to improve two mechanical properties of the PEEK which are generally antagonistic, namely the yield point and the elongation at break.

The composition based on PEEK and on PEKK as defined above can be prepared by any known method which makes it possible to obtain a homogeneous blend containing the composition according to the invention and optionally other additives, fillers or other polymers. Such a method can be chosen from melt extrusion, compacting or also mixing techniques, for example using a roll mill.

More particularly, the composition according to the invention is prepared by melt blending all its components, in particular in a "direct" process.

In the case of laser sintering, the composition can also be obtained by a dry blending of powders.

Advantageously, the composition can be obtained in the form of granules by compounding on a device known to a person skilled in the art, such as a twin-screw extruder, a cokneader or an internal mixer.

The composition thus prepared can subsequently be converted, for a subsequent conversion or use known to a person skilled in the art, using devices such as an injection moulding machine, an extruder, and the like.

The process for the preparation of the composition according to the invention can also use a twin-screw extruder feeding, without intermediate granulation, an injection moulding machine or an extruder according to a processing arrangement known to a person skilled in the art.

It is possible, starting from the composition obtained, which can be either granules or powders, to manufacture different objects by a laser sintering or injection moulding or extrusion technique, for example.

The following examples illustrate, without implied limitation, the scope of the invention:

Example 1

Compounding of Several Compositions Exhibiting Different Formulations

The compounding is a process which makes it possible to blend, by melting, plastics and/or additives and/or fillers.

In order to manufacture each composition, the starting materials, which are provided in the form of granules, are placed in a corotating twin-screw extruder. The feed zone of the extruder is heated to a temperature of the order of 300° C.

The blending of the materials takes place under molten conditions at a temperature of the order of 360° C., with a rotational speed of 300 revolutions/minute and a throughput of 2.5 kg/h.

The different compositions which were manufactured by compounding in order to be compared all comprise PEEK and PEKK in different proportions by wieght. The PEKK incorporated in the composition is a PEKK comprising terephthalic (T) and isophthalic (I) units, the T/I ratio of which is equal to 60/40. Two different grades of PEKK were used. These two grades comprise the same proportions of terephthalic units. They differ from one another essentially in their viscosity. Thus, a first PEKK, referenced K1 in Table I and II below and sold by Arkema under the commercial reference Kepstan® 6001, exhibits a viscosity number of 0.95 dl/g, whereas the second PEKK, referenced K3 in the table I below and sold by Arkema under the commercial reference Kepstan® 6003, exhibits a viscosity number of 0.82 dl/g. The viscosity number is measured according to Standard ISO 307, in solution at 25° C. in 96% sulphuric acid.

In these comparative examples, the proportion by weight of PEKK in the composition varies between 10 and 30% of the total weight of the composition for table I and from 5 to 50% for table II. The compositions based on PEEK and on PEKK are intended to be compared with a control composition, referenced CC (table I), comprising solely pure PEEK, sold by Victrex under the commercial reference Victrex 450G, and referenced CT (table II), comprising solely pure PEEK, sold by Victrex under the commercial reference Victrex 150G.

The different compositions produced are combined in Table I and II below. The amounts of the different constituents of the composition, that is to say of PEEK and of PEKK, are expressed as percentage by weight, with respect to the total weight of the composition.

TABLE I

|  | CC | C1 | C2 | C3 | C4 | C5 | C6 |
|---|---|---|---|---|---|---|---|
| PEEK 450G | 100% | 90% | 80% | 70% | 90% | 80% | 70% |
| PEKK (K1) |  | 10% | 20% | 30% |  |  |  |
| PEKK (K3) |  |  |  |  | 10% | 20% | 30% |

TABLE II

|  | CT | C1a | C2a | C3a | C4a | C5a |
|---|---|---|---|---|---|---|
| PEEK 150G | 100% | 95% | 90% | 80% | 70% | 50% |
| PEKK (K1) |  | 5% | 10% | 20% | 30% | 50% |

Example 2

Study of the Kinetics of Crystallization of the Compositions Obtained on Conclusion of the Compounding Process of Example 1

A crystallization study was carried out on the control sample of PEEK, referenced CC in Table I above, and on the six samples of compositions referenced C1 to C6 in Table I above.

The crystallization study is carried out by differential scanning calorimetry, denoted DSC. DSC is a thermal analysis technique which makes it possible to measure the differences in the heat exchanges between a sample to be analyzed and a reference.

Use was made, in order to carry out this crystallization study, of the Q 2000 device from TA Instruments. The study was carried out under anisothermal and isothermal crystallization conditions.

Anisothermal Crystallization

The protocol for DSC under anisothermal conditions, on the different samples CC and C1 to C6 resulting from Example 1, consists, in a first step, in stabilizing the temperature at 20° C. The temperature is subsequently gradually increased, along a gradient of 20° C. per minute, up to 400° C. and then it is again gradually decreased down to 20° C., along a reverse gradient of 20° C. per minute.

The crystallization is studied during the cooling stage. The heat flow is measured as a function of temperature and a curve representing the change in the heat flow as a function of temperature is obtained for each composition studied. These curves are represented in FIG. 1. The crystallization temperature, denoted Tc and expressed in degrees Celsius, is subsequently determined for each composition by projecting the maximum of the corresponding curve onto the axis of the abscissae. This determination is carried out directly by the DSC equipment used.

The crystallization temperatures Tc of each sample analyzed are combined in Table II below.

TABLE II

| Composition | Tc (° C.) |
|---|---|
| CC | 291.3 |
| C1 | 289.1 |
| C2 | 288.0 |
| C3 | 286.6 |
| C4 | 289.1 |
| C5 | 287.7 |
| C6 | 286.7 |

The curve of the control composition CC (pure PEEK), which does not comprise PEKK, is the curve located furthest to the right in the graph of FIG. 1. This control composition exhibits a crystallization temperature $Tc_{cc}$ which is the highest, equal to 291.3° C.

These curves demonstrate that, the higher the fraction by weight of PEKK in the composition, the lower the crystallization temperature and thus the more the crystallization is delayed. The addition of PEKK to the PEEK according to the invention thus makes it possible to delay the crystallization of the PEEK.

Isothermal crystallization

DSC under isothermal conditions was carried out for a sample of control composition CC and samples of the compositions C1, C2 and C3 respectively comprising 10%, 20% and 30% by weight of PEKK. The protocol of the isothermal DSC comprises the following three stages: a first stage consists, in a first step, in stabilizing the temperature at 20° C., a second stage subsequently consists in gradually increasing the temperature, along a gradient of 20° C. per minute, up to 400° C. Finally, the temperature is reduced from 400° C. down to 315° C., along a gradient of 20° C. per minute, and then it is stabilized at 315° C. for one hour.

Figure 2:
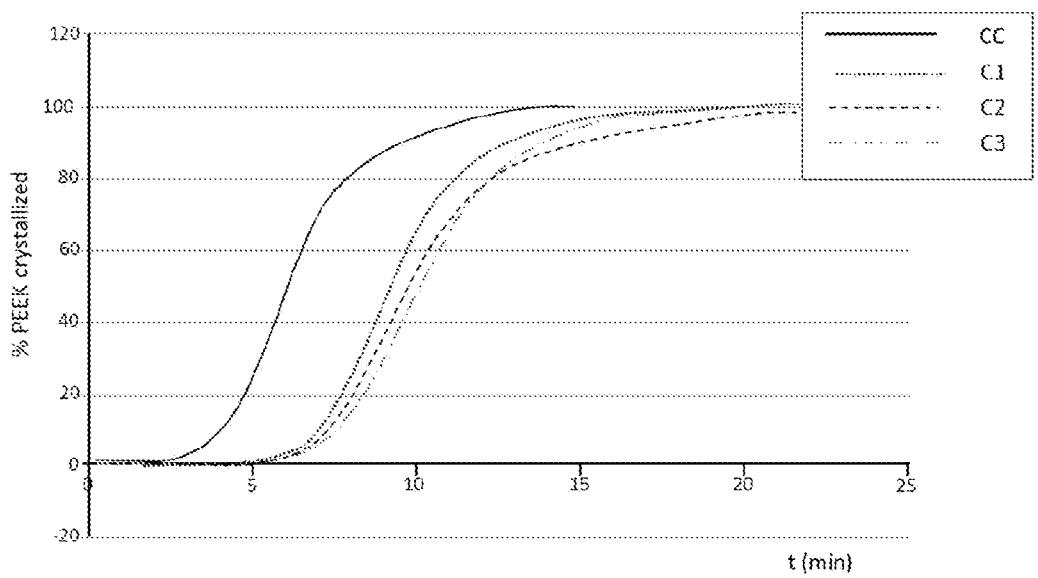

During the hour of stabilization of the temperature at 315° C., the fraction by weight of PEEK crystallized as a function of time t is measured. The measurements are carried out on the compositions C1, C2 and C3, in comparison with the control composition CC. The four curves obtained are represented in the graph of FIG. 2.

It results from the curve corresponding to the control sample CC that the crystallization half time is approximately 6 minutes. The crystallization half time of a polymer is the time necessary for the crystallization of 50% of this polymer. On the curves of FIG. 2, it is determined by being placed at the value of 50% on the axis of the ordinates (% of crystallized PEEK) and by projecting this value onto the axis of the abscissae (Time).

The curve corresponding to the composition C3 is offset to the right by approximately 4 minutes, with respect to the curve of the control composition CC. The crystallization half time on this curve is approximately 10 minutes. The curves corresponding to the compositions C1 and C2 are offset to the right by approximately 3 minutes, with respect to the curve of the control composition CC, the crystallization half time of the composition C1 being approximately 9 minutes and that of the composition C2 being virtually 10 minutes.

It results from these curves that, surprisingly, the delay in crystallization is not proportional to the content of PEKK incorporated in the composition. Contrary to what might have been expected, the change in crystallization kinetics is not linear as a function of the content of PEKK incorporated. Consequently, it is preferable to incorporate a content of PEKK of less than or equal to 40% by weight, with respect to the total weight of the composition, in order to prevent the appearance of a phenomenon of phase separation in the composition.

The addition of PEKK in a proportion of 1 to 40% by weight, preferably between 5 and 40% by weight and more preferably still between 10 and 30% by weight, with respect to the total weight of the PEEK-based composition according to the invention, thus makes it possible to delay the crystallization of the PEEK, while avoiding a phenomenon of phase separation.

Example 3

Measurement of the Yield Point Stress and of the Elongation at Break of Injection-Moulded Parts Based on the Compositions Obtained on Conclusion of the Compounding Process of Example 1

In order to be able to carry out measurements of yield point stress and of elongation at break, test specimens of samples were produced in a first step. For this, an injection moulding machine is used. In this example, the injection moulding machine used is a Battenfeld 80T moulding machine. The feed temperature of the moulding machine is regulated at 350° C., the temperature of the injection nozzle is regulated at 390° C. and the temperature of the mould is set at 230° C.

Test specimens appropriate for tensile tests of 1BA type according to Standard ISO 527 are then obtained.

For the comparative tests of measurement of yield point stress and of elongation at break, two test specimens were produced according to Standard ISO 527 1BA. A first test specimen of the control composition CC is compared with a second test specimen of the composition C3 of Example 1, comprising 30% by weight of PEKK, and the same procedure was repeated for controle composition CT compared with specimen C10 to C5a.

The measurements of stress were carried out on each test specimen using a tensile testing device coupled to an optical extensometer, making possible the recording of the curves of stress as a function of the strain of the test specimens subjected to a tensile stress. The tensile testing device used for these tests is more particularly a tensile testing device from Zwick sold under the reference Zwick 1455.

The measurements are carried out at 23° C., at a relative humidity of 50% RH and at a pull rate of 25 mm/min.

The tensile force necessary as a function of the elongation is then measured and the yield point stress and the elongation at break are determined. The results obtained are combined in Table III and IV below.

TABLE III

| Composition | Yield point stress (MPa) | Elongation at break (%) |
|---|---|---|
| CC | 92.5 | 40 |
| C3 | 101 | 100 |

TABLE IV

| Composition | Yield point stress (MPa) | Elongation at break (%) |
|---|---|---|
| CT | 103 | 70 |
| C1a | 103 | 85 |
| C2a | 103 | 100 |
| C3a | 102 | 110 |
| C4a | 102 | 85 |
| C5a | 99 | 50 |

The addition of 30% by weight of PEKK to PEEK makes it possible to change the yield point stress from 92.5 MPa to 101 MPa, i.e. an increase of 7.5% in results from table III. Furthermore, this addition makes it possible to increase the elongation at break from 40% to 100%, i.e. an increase by a factor of 2.5.

From Table IV, same conclusion can be formulated for elongation at break. Additionally, 50% composition (C5a) which is out of the claimed compositions shows that maximum of PEKK to be advantageously mixed with PEEK should be 40%, not more.

Thus, the incorporation of PEKK in a PEEK-based composition brings about an increase in the yield point stress and also an increase in the elongation at break and thus an increase in two mechanical properties which are generally antagonistic.

The composition according to the invention exhibits not only the advantage of slowing down the kinetics of crystallization of PEEK, and thereby of reducing the internal stresses of the material, of thus dispensing with a lengthy and expensive post annealing stage and of obtaining non deformed parts having the desired optimum geometry, but it exhibits in addition the advantage of having exceptional mechanical properties with a gain in the yield point and in the elongation at break, which were until now known to be antagonistic mechanical properties.

What is claimed is:

1. A composition comprising a) a polymer selected from poly(ether ether ketone) (PEEK), poly(ether ketone) (PEK) or poly(ether ketone ether ketone ketone) (PEKEKK) and b) poly(ether ketone ketone) (PEKK), wherein the poly(ether ketone ketone) (PEKK) comprises a mixture of terephthalic and isophthalic units, the percentage by weight of terephthalic units, with respect to the sum of the terephthalic and isophthalic units, being between 55 and 85%, limits included, and wherein the composition is comprised of between 1 and 40%, limits included, by weight of PEKK, with respect to the total weight of the composition.

2. The composition according to claim 1, wherein the PEKK is a PEKK blend, each PEKK exhibiting a percentage by weight of terephthalic units, with respect to the sum of the terephthalic and isophthalic units, of between 55 and 85%, limits included.

3. The composition according to claim 1, wherein the composition comprises at least one additive.

4. The composition according to claim 1, wherein the composition is comprised of PEEK and the proportion by weight of PEEK in the composition is between 60 and 99%, limits included, with respect to the total weight of the composition.

5. The composition according to claim 1, wherein the percentage by weight of terephthalic units, with respect to the sum of the terephthalic and isophthalic units, is between 55 and 70%.

6. The composition according to claim 1, wherein the composition is comprised of between 5 and 40%, limits included, by weight of PEKK, with respect to the total weight of the composition.

7. The composition according to claim 1, wherein the composition is comprised of between 10 and 30%, limits included, by weight of PEKK, with respect to the total weight of the composition.

8. The composition according to claim 1, wherein the PEKK is a PEKK blend, each PEKK exhibiting a percentage by weight of terephthalic units, with respect to the sum of the terephthalic and isophthalic units, of between 55 and 70%, limits included.

9. The composition according to claim 1, wherein the composition is comprised of PEEK and the proportion by weight of PEEK in the composition is between 60 and 95%, limits included, with respect to the total weight of the composition.

10. The composition according to claim 1, wherein the composition is comprised of PEEK and the proportion by weight of PEEK in the composition is between 70 and 90%, limits included, with respect to the total weight of the composition.

11. A process for improving the yield point and/or the elongation at break of a composition comprised of poly (ether ether ketone) (PEEK), poly(ether ketone) (PEK) or poly(ether ketone ether ketone ketone) (PEKEKK), wherein the process comprises incorporating PEKK in the composition, wherein the PEKK comprises a mixture of terephthalic and isophthalic units, the percentage by weight of terephthalic units, with respect to the sum of the terephthalic and isophthalic units, being between 55 and 85%, limits included, and wherein the PEKK is incorporated in the composition in a proportion of between 1 and 40%, limits included, by weight, with respect to the total weight of the composition.

12. The process according to claim 11, wherein the percentage by weight of terephthalic units, with respect to the sum of the terephthalic and isophthalic units, is between 55 and 70%, limits included.

13. The process according to claim 11, wherein the PEKK is incorporated into the composition in a proportion of between 5 and 40%, limits included, by weight, with respect to the total weight of the composition.

14. The process according to claim 11, wherein the PEKK is incorporated into the composition in a proportion of between 10 and 30%, limits included, by weight, with respect to the total weight of the composition.

15. An object manufactured from a composition according to claim 1 using a technology selected from the group consisting of laser sintering, moulding, injection moulding and extrusion.

* * * * *